United States Patent [19]

Pigott et al.

[11] Patent Number: 5,111,381
[45] Date of Patent: May 5, 1992

[54] H-BRIDGE FLYBACK RECIRCULATOR

[75] Inventors: John M. Pigott, Phoenix; Robert B. Jarrett, Tempe, both of Ariz.

[73] Assignee: Motorola, Inc., Schaumburg, Ill.

[21] Appl. No.: 743,955

[22] Filed: Aug. 12, 1991

[51] Int. Cl.$^5$ .......................................... H02M 7/5387
[52] U.S. Cl. ........................................ 363/132; 363/56
[58] Field of Search ...................... 363/17, 56, 63, 98, 363/132

[56] References Cited

U.S. PATENT DOCUMENTS

| | | | |
|---|---|---|---|
| 4,545,004 | 10/1985 | Kade et al. | 363/63 |
| 4,651,269 | 3/1987 | Matsumura | 363/63 |
| 4,691,270 | 9/1987 | Pruitt | 363/56 |
| 4,859,921 | 8/1989 | Archer | 318/599 |
| 4,860,189 | 8/1989 | Hitchcock | 363/132 |
| 4,884,186 | 11/1989 | Small | 363/17 |
| 4,937,802 | 6/1990 | Omori et al. | 363/98 |

Primary Examiner—Steven L. Stephan
Assistant Examiner—Jeffrey Sterrett
Attorney, Agent, or Firm—Bradley J. Botsch

[57] ABSTRACT

A circuit for discharging an inductive load of an H-bridge circuit at a controlled rate has been provided. When a first half of the H-bridge circuit is switched from a conductive state to a non-conductive state, the circuit clamps a first side of the inductive load, while creating a recirculation path to discharge the inductive load at a controlled rate.

A similar circuit may be utilized when a second (complementary) half of the H-bridge circuit is switched from a conductive state to a non-conductive state wherein the similar circuit clamps a second side of the inductive load, while creating a recirculation path to discharge the inductive load at a controlled rate.

8 Claims, 2 Drawing Sheets

_5,111,381_

H-BRIDGE FLYBACK RECIRCULATOR

FIELD OF THE INVENTION

This invention relates to circuits, for example, an H-bridge flyback recirculator circuit.

An inductive load is typically coupled across first and second output terminals of an H-bridge circuit. The H-bridge circuit alternately supplies current through the inductive load in a first and a second polarity in response to an applied control signal. That is, when the control signal is in a first state, current flows from the first output terminal, through the inductive load, to the second output terminal. Further, when the control signal is in a second state, current flows from the second output terminal, through the inductive load, to the first output terminal. However, when switching the current polarity through the inductive load, if the energy stored in the inductive load is not allowed to decay in a controlled fashion, the voltage at the first or second, or both, output terminals of the H-bridge circuit will rapidly increase, as is well known.

One attempt at controlling the current discharge through an inductive load of an H-bridge circuit entails utilizing reverse connected diodes coupled across each switch of the H-bridge circuit. However, in an integrated circuit, this attempt may cause undesired injection of carriers into the substrate which can affect the operation of other circuits.

Another attempt at controlling the current discharge through an inductive load of an H-bridge circuit entails utilizing a timer circuit that is rendered conductive at the proper time in order to clamp the voltage appearing at the first and second output terminals of the H-bridge circuit to predetermined values. However, this attempt requires a knowledge of the drive signals and of the characteristics of the inductive load for optimal operation.

Hence, there exists a need to provide an improved circuit for controlling the current discharge through an inductive load of an H-bridge circuit.

SUMMARY OF THE INVENTION

Briefly, there is provided an H-Bridge circuit responsive to first and second control signals and having first and second output terminals, an inductive load being coupled across the first and second terminals, the H-bridge circuit being formed by a first half which includes a first transistor pair and a second half which includes a second transistor pair, the first half of the H-bridge circuit being rendered conductive when the first control signal is in a first logic state, the second half of the H-bridge circuit being rendered conductive when the second control signal is in a first logic state, the H-bridge circuit comprising a first circuit coupled to the second output terminal for clamping the second output terminal to a predetermined voltage, the first circuit providing current drive to one of the first transistor pair of the first half of the H-bridge circuit thereby creating a first recirculation path to discharge the inductive load.

The present invention will better understood from the following detailed description taken in conjunction with the accompanying drawings.

DETAILED DESCRIPTION OF THE DRAWINGS

Figure 1:
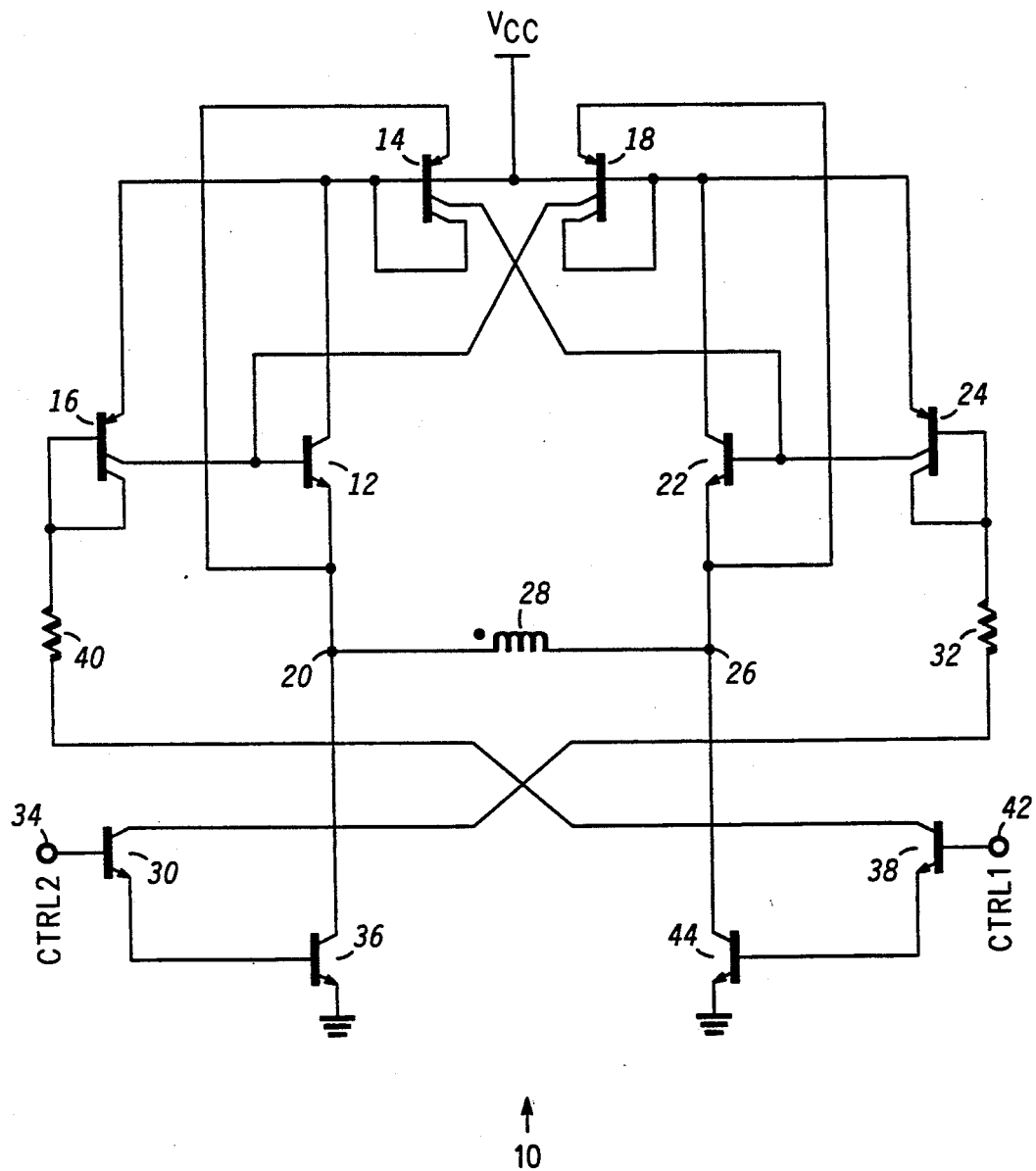
FIG. 1 is a detailed schematic diagram illustrating an H-bridge circuit in accordance with the present invention.

Referring to FIG. 1, the detailed schematic diagram illustrating H-bridge circuit 10 is shown comprising transistor 12 having a collector coupled to the base of transistor 14 and to the emitter of transistor 16. The collector of transistor 12 is also coupled to receive operating potential $V_{CC}$. The base of transistor 12 is coupled to a first collector of transistor 16 and to a first collector of transistor 18. The emitter of transistor 12 is coupled to the emitter of transistor 14 and to circuit node 20 whereby circuit node 20 represents a first output of H-bridge circuit 10.

Transistor 22 has a collector coupled to the base of transistor 18 and to the emitter of transistor 24. The collector of transistor 22 is also coupled to receive operating potential $V_{CC}$. The base of transistor 22 is coupled to the first collector of transistor 24 and to the first collector of transistor 14. The emitter of transistor 22 is coupled to the emitter of transistor 18 and to circuit node 26 whereby circuit node 26 represents a second output of H-bridge circuit 10.

The second collectors of transistors 14 and 18 are respectively coupled to the bases of transistors 14 and 18. Likewise, the second collectors of transistors 16 and 24 are respectively coupled to the bases of transistors 16 and 24.

Inductive load 28 is coupled across circuit nodes 20 and 26.

Transistor 30 has a collector coupled through resistor 32 to the base of transistor 24. The base of transistor 30 is coupled to terminal 34 at which signal CTRL2 is applied. The emitter of transistor 30 is coupled to the base of transistor 36, the latter having an emitter returned to ground. The collector of transistor 36 is coupled to circuit node 20.

Transistor 38 has a collector coupled through resistor 40 to the base of transistor 16. The base of transistor 38 is coupled to terminal 42 at which signal CTRL1 is applied. The emitter of transistor 38 is coupled to the base of transistor 44, the latter having an emitter returned to ground. The collector of transistor 44 is coupled to circuit node 26.

Switching transistors 12, 22, 36 and 44 form an H-bridge circuit wherein transistor pair 12 and 44 and transistor pair 22 and 36 are alternately rendered active via control signals CTRL1 and CTRL2. When signal CTRL1 is in a first logic state, for example, a logic high state, and signal CTRL2 is in a second logic state, a first half of H-bridge circuit 10 formed by transistors 12 and 44 is rendered conductive. Thus, current is provided in a first direction through inductive load 28 that flows from operating potential $V_{CC}$ through transistor 12, through inductive load 28 and through transistor 44 to ground.

On the other hand, when signal CTRL2 is in a first logic state and signal CTRL1 is in a second logic state, a second half of H-bridge circuit 10 formed by transistors 22 and 36 is rendered conductive. Thus, current is provided in a second direction through inductive load 28 that flows from operating potential $V_{CC}$ through transistor 22, through inductive load 28 and through transistor 36 to ground.

In operation, when signal CTRL1 applies a logic high voltage to the base of transistor 38, transistor 38 is rendered conductive and provides current to the base of transistor 44 thereby driving transistor 44 into saturation. Further, since transistor 38 is rendered conductive, current flows from operating potential $V_{CC}$ through transistor 16 and resistor 40, and through transistors 38 and 44. It is worth noting that transistor 16 is operating in the saturation region when transistor 38 is rendered conductive. Current then flows into the base of transistor 12 via the first collector of transistor 16, thereby rendering transistor 12 conductive. As a result, a first current path is created wherein current flows from operating potential $V_{CC}$ through transistor 12, through inductive load 28 (from circuit node 20 to 26), and returned to ground through transistor 44.

At this point, the voltage appearing at circuit node 20 ($V_{N20}$) can be expressed as shown in EQN. 1.

$$V_{N20} = V_{CC} - V_{SAT(Q16)} - V_{BE(Q12)} \quad (1)$$

where $V_{SAT(Q16)}$ is the saturation voltage of transistor 16; and $V_{BE(Q12)}$ is the base emitter voltage of transistor 12.

Further, the voltage appearing at circuit node 26 ($V_{N26}$) is substantially equal to the saturation voltage of transistor 44 $\{V_{N26} = V_{SAT(Q44)}\}$.

However, when signal CTRL1 switches from a first logic state to a second logic state (a logic high state to a logic low state), transistor 38 is rendered non-conductive thereby rendering transistor 44 non-conductive. Since transistor 38 is non-conductive, transistor 16 is also non-conductive wherein the first collector of transistor 16 no longer provides current to the base of transistor 12. As a result, the first current path has been interrupted.

Since the current through inductive load 28 cannot change instantaneously, the voltage at circuit node 26 rapidly increases. However, the present invention provides a clamp, via transistor 18, such that the voltage at circuit node 26 is clamped to a predetermined voltage that is substantially equal to one diode voltage above operating potential $V_{CC}$. That is, as the voltage appearing at circuit node 26 increases to a predetermined voltage, transistor 18 turns on and clamps the voltage at circuit node 26 to a predetermined voltage substantially equal to $V_{CC} + V_{BE(Q18)}$.

Moreover, as transistor 18 turns on, the first collector of transistor 18 supplies a predetermined amount of the total collector current to the base of transistor 12 thereby maintaining transistor 12 conductive. As an example, the second collector of transistor 18 may be nine times the size of the first collector of transistor 18. Thus, if the total collector current of transistor 18 is 100 mA, then 10 mA flows through the first collector, while 90 mA flows through the second collector.

Thus, since transistor 12 is maintained conductive via the current supplied from the first collector of transistor 18, a first recirculation current path is completed which allows a controlled discharge of current through inductive load 28. In particular, the first recirculation path is formed by the closed loop of transistor 18, transistor 12 and inductive load 28.

Also during the switching of signal CTRL1 from a logic high voltage to a logic low voltage, the voltage appearing at circuit node 20 rises from its initial voltage as shown in EQN. 1, when current is still flowing through inductive load 28, to a saturation voltage below $V_{CC}$ as shown in EQN. 2.

$$V_{N20} = (V_{CC} + V_{BE(Q18)}) - V_{SAT(Q18)} - V_{BE(Q12)} = V_{CC} - V_{SAT(Q18)} \quad (2)$$

where EQN. 2 assumes that the base emitter voltages of transistors 12 and 18 are substantially equal.

The first recirculation path allows the voltages appearing at circuit nodes 20 and 26 to approach a substantially equal value as the stored energy of inductive load 28 approaches zero.

In summary, the present invention utilizes transistor 18 to clamp circuit node 26 to a predetermined voltage. In addition, the first collector of transistor 18 also provides drive current to the base of transistor 12 to maintain transistor 12 conductive thereby completing a first recirculation path to allow the current of inductive load 28 to discharge at a controlled rate.

Figure 2:
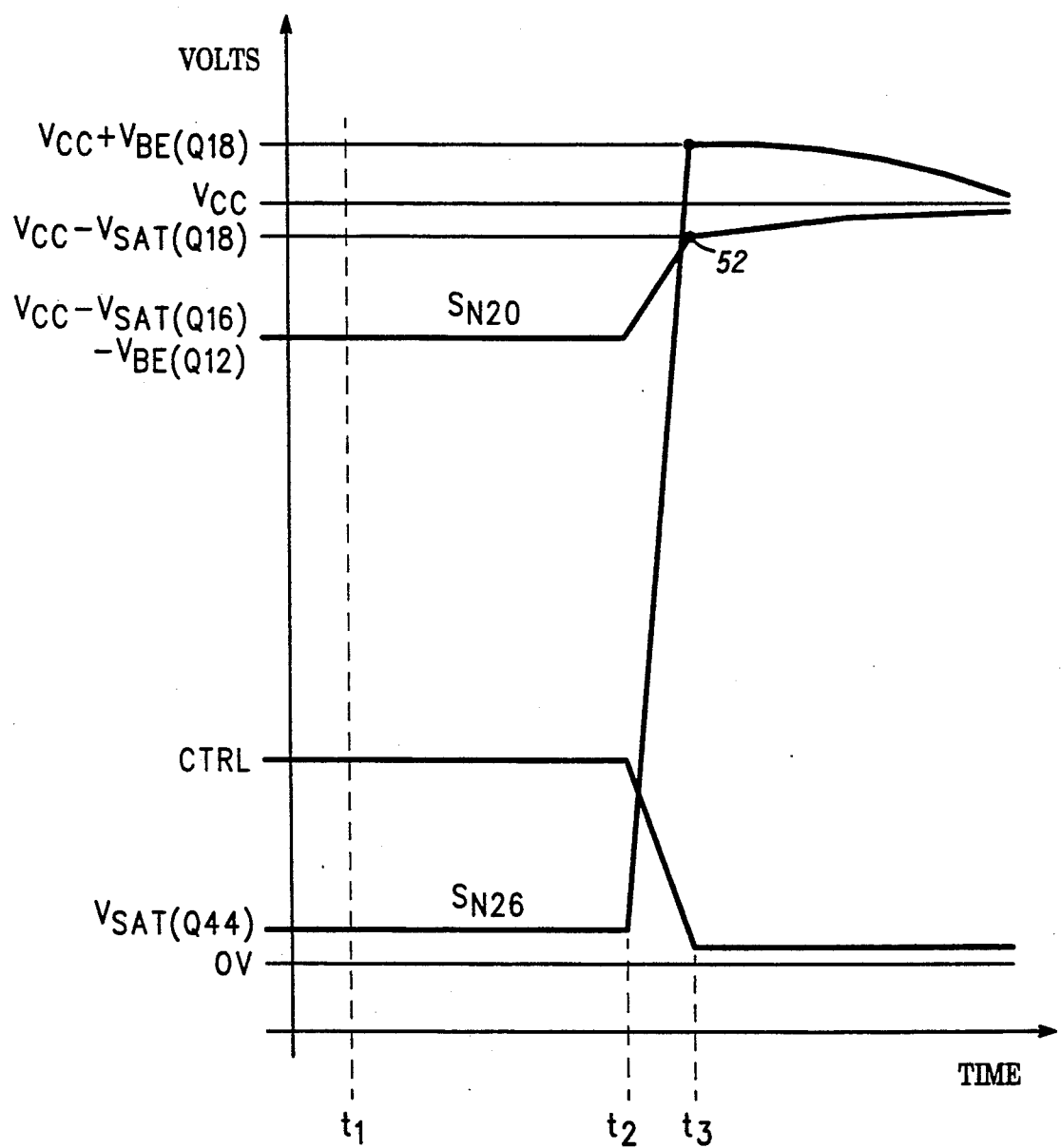
FIG. 2 is a graphical diagram illustrating signals appearing at selected nodes of the H-bridge circuit of FIG. 1.

Referring to FIG. 2, the graphical diagram illustrating signals appearing at selected nodes of H-bridge circuit 10 of FIG. 1 is shown.

In particular, between time interval $t_1$ to $t_2$, signal CTRL1 is in a logic high state as shown by signal CTRL1. The signal appearing at circuit node 20, denoted by signal $S_{N20}$, is at the voltage substantially equal to $(V_{CC} - V_{SAT(Q16)} - V_{BE(Q12)})$ as expressed in EQN. 1. Further, the signal appearing at circuit node 26, denoted by signal $S_{N26}$, is shown to be at a voltage substantially equal to $V_{SAT(Q44)}$.

During time interval $t_2$ to $t_3$, signal CTRL1 switches from a logic high state to a logic low state. As aforedescribed, the voltage appearing at circuit node 26 rapidly increases to a diode voltage above voltage $V_{CC}$ as illustrated by reference number 50 of signal $S_{N26}$. In addition, the voltage appearing at circuit node 20 rises from its initial voltage as shown in EQN. 1, to a saturation voltage below voltage $V_{CC}$ as calculated in EQN. 2 and as illustrated by reference number 52 of signal $S_{N20}$.

From time $t_3$ up until transistor 30 or transistor 38 is rendered conductive, the first recirculation path as aforedescribed is active. Thus, the voltages appearing at circuit nodes 20 and 26 approach voltage $V_{CC}$ as the current flowing through inductive load 28 decays to zero.

Referring back to FIG. 1, it should be understood that transistor 14 operates in a similar manner as transistor 18 for the second (complementary) half of H-bridge circuit 10.

In particular, the second half of H-bridge circuit 10 includes transistors 22, 36, 30, 24 and 14 which are analogous to transistors 12, 44, 38, 16 and 18 of the aforedescribed first half of H-bridge circuit 10. In addition, resistor 32 is analogous to resistor 40. Thus, a detailed description for the operation of the second half of H-bridge circuit 10 is not included thereby avoiding redundancy.

Briefly, it is understood that transistor 14 clamps circuit node 20 to a predetermined voltage, while the first collector of transistor 14 provides a drive current to maintain transistor 22 conductive thereby allowing inductive load 28 to discharge at a controlled rate. Thus, a second recirculation path is formed by the closed loop of transistor 14, transistor 22 and inductive load 28.

By now it should be appreciated from the foregoing discussion a novel circuit for discharging an inductive load of an H-bridge circuit at a controlled rate has been provided. The present invention provides a circuit to clamp one side of an inductive load, while utilizing the circuit to create a recirculation path to discharge the inductive load at a controlled rate.

While the invention has been described in conjunction with specific embodiments thereof, it is evident that many alterations, modifications and variations will be apparent to those skilled in the art in light of the foregoing description. Accordingly, it is intended to embrace all such alternations, modifications and variations in the appended claims.

We claim:

1. An H-Bridge circuit reponsive to first and second control signals and having first and second output terminals, and inductive load being coupled across the first and second terminals, the H-bridge circuit being formed by a first half which includes a first transistor pair and a second half which includes a second transistor pair, the first half of the H-bridge circuit being rendered conductive when the first control signal is in a first logic state, the second half of the H-bridge circuit being rendered conductive when the second control signal is in a first logic state, the H-bridge circuit comprising:

a first circuit coupled to the second output terminal for clamping the second output terminal to a predetermined voltage, said first circuit providing current drive to a transistor of the first transistor pair of the first half of the H-bridge circuit thereby creating a first recirculation path to discharge the inductive load.

2. The H-bridge circuit according to claim 1 further including a second circuit coupled to the first output terminal for clamping the first output terminal to a predetermined voltage, said second circuit providing current drive to a transistor of the second transistor pair of the second half of the H-bridge circuit thereby creating a second recirculation path to discharge the inductive load.

3. The H-bridge circuit according to claim 1 wherein said first circuit includes a first transistor having first and second collectors, a base and an emitter, said first collector of said first transistor being coupled to a base of said one of the first transistor pair, said second collector of said first transistor being coupled to said base of said first transistor, and said emitter of said first transistor being coupled to the second output terminal.

4. The H-bridge circuit according to claim 2 wherein said second circuit includes a second transistor having first and second collectors, a base and an emitter, said first collector of said second transistor being coupled to a base of said one of the second transistor pair, said second collector of said second transistor being coupled to said base of said second transistor, and said emitter of said second transistor being coupled to the first output terminal.

5. An H-bridge circuit having first and second output terminals, an inductive load being coupled across the first and second output terminals, comprising:

a first transistor having a collector, a base and an emitter, said collector being coupled to a first supply voltage terminal, said base being responsive to a first control signal, said emitter being coupled to the first output terminal;

a second transistor having a collector, a base and an emitter, said collector of said second transistor being coupled to said first supply voltage terminal, said base of said second transistor being responsive to a second control signal, said emitter of said transistor being coupled to the second output terminal;

a third transistor having a collector, a base and an emitter, said collector of said third transistor being coupled to the second output terminal, said base of said third transistor being coupled to receive said first control voltage, and said emitter of said third transistor being coupled to a second supply voltage terminal;

a fourth transistor having a collector, a base and an emitter, said collector of said fourth transistor being coupled to the first output terminal, said base of said fourth transistor being coupled to receive said second control voltage, and said emitter of said fourth transistor being coupled to said second supply voltage terminal; and a fifth transistor having first and second collectors, a base and an emitter, said first collector of said fifth transistor being coupled to said base of said first transistor, said second collector of said fifth transistor being coupled to said base of said fifth transistor, and said emitter of said fifth transistor being coupled to the second output terminal.

6. The H-bridge circuit according to claim 5 further including a sixth transistor having first and second collectors, a base and an emitter, said first collector of said sixth transistor being coupled to said base of said second transistor, said second collector of said sixth transistor being coupled to said base of said sixth transistor, and said emitter of said sixth transistor being coupled to the first output terminal.

7. A circuit having first and second output terminals, the circuit having an inductive load coupled across the first and second terminals, comprising:

a first transistor having a collector, a base and an emitter, said collector being coupled to a first supply voltage terminal, said emitter being coupled to the first output terminal;

a second transistor having a collector, a base and an emitter, said collector of said second transistor being coupled to said first supply voltage terminal, said emitter of said second transistor being coupled to the second output terminal;

a third transistor having a collector, a base and an emitter, said collector of said third transistor being coupled to the second output terminal, said emitter of said third transistor being coupled to a second supply voltage terminal;

a fourth transistor having a collector, a base and an emitter, said collector of said fourth transistor being coupled to the first output terminal, said emitter of said fourth transistor being coupled to said second supply voltage terminal;

a fifth transistor having a collector, a base and an emitter, said base of said fifth transistor being coupled to receive a first control voltage, said emitter of said fifth transistor being coupled to said base of said third transistor;

a sixth transistor having a collector, a base and an emitter, said base of said sixth transistor being coupled to receive a second control voltage, said emitter of said fifth transistor being coupled to said base of said fourth transistor;

a seventh transistor having first and second collectors, a base and an emitter, said first collector of said seventh transistor being coupled to said base of said first transistor, said second collector of said ninth transistor being coupled to said base of said ninth transistor and to said collector of said fifth transistor, and said emitter of said ninth transistor being coupled to said first supply voltage terminal;

a eighth transistor having first and second collectors, a base and an emitter, said first collector of said eighth transistor being coupled to said base of said first transistor, said second collector of said eighth transistor being coupled to said base of said eighth transistor and to said collector of said sixth transistor, said emitter of said eighth transistor being coupled to said first supply voltage terminal; and a ninth transistor having first and second collectors, a base and an emitter, said first collector of said ninth transistor being coupled to said base of said first transistor, said second collector of said ninth transistor being coupled to said base of said ninth transistor, and said emitter of said ninth transistor being coupled to the second output terminal.

8. The H-bridge circuit according to claim 7 further including a tenth transistor having first and second collectors, a base and an emitter, said first collector of said tenth transistor being coupled to said base of said second transistor, said second collector of said tenth transistor being coupled to said base of said tenth transistor, and said emitter of said ninth transistor being coupled to the first output terminal.

* * * * *